United States Patent [19]

Schneider

[11] Patent Number: 5,370,305
[45] Date of Patent: Dec. 6, 1994

[54] SANITARY MIXER TAP WITH THERMOSTAT CONTROL

[75] Inventor: Hermann J. Schneider, Schweich, Germany

[73] Assignee: Ideal-Standard GmbH, Bonn, Germany

[21] Appl. No.: 157,118

[22] PCT Filed: May 29, 1992

[86] PCT No.: PCT/EP92/01201
§ 371 Date: Dec. 6, 1993
§ 102(e) Date: Dec. 6, 1993

[87] PCT Pub. No.: WO92/22862
PCT Pub. Date: Dec. 23, 1992

[30] Foreign Application Priority Data
Jun. 5, 1991 [DE] Germany ............... 4118477
Jun. 18, 1991 [DE] Germany ............... 4120024

[51] Int. Cl.⁵ .................................. G05D 23/13
[52] U.S. Cl. .................... 236/12.2; 137/625.4
[58] Field of Search ........... 236/12.2, 12.21, 12.22; 137/625.4, 625.5

[56] References Cited
U.S. PATENT DOCUMENTS

| | | | |
|---|---|---|---|
| 3,561,482 | 2/1971 | Taplin | 137/625.4 |
| 3,768,728 | 10/1973 | Blank | 236/12.2 |
| 4,738,393 | 4/1988 | Bergmann et al. | 236/12.16 |

FOREIGN PATENT DOCUMENTS

| | | |
|---|---|---|
| 0156122 | 10/1985 | European Pat. Off. . |
| 2067762 | 8/1971 | France . |
| 2397579 | 2/1979 | France . |
| 3800579 | 3/1989 | Germany . |
| 9105968 | 5/1991 | WIPO . |

Primary Examiner—William E. Tapolcai
Attorney, Agent, or Firm—Sixbey, Friedman, Leedom & Ferguson

[57] ABSTRACT

A sanitary mixer tap with thermostat control comprises a cold water inlet (1), a hot water inlet (2) and a mixed water outlet, and incorporates a fixed valve seat disc (3), a valve disc (4), a temperature control and regulation unit (5), a control and regulation piston (6), a temperature dependent regulating element (7), an actuating lever, and a control lever (8) connected to the actuating lever. The valve seat disc (3) has a cold water inlet opening (9) connecting with the cold water inlet (1) and a hot water inlet opening (10) connecting with the hot water inlet (2), and the valve disc has passages (11, 12) communicating with the cold water inlet opening (9) and the hot water inlet opening (10) of the valve seat disk (3). The temperature control and regulating unit (5) has cold and hot water inlet openings (13, 14) communicating with the passages (11, 12) in the valve disc (4), and also annular spaces (15, 16) for cold and hot water respectively. The control and regulating piston (6) can be set relative to the temperature control and regulating unit (5) in an initial temperature-determining position of temperature control, and can be controlled for temperature regulating purposes by means of the regulating element (7). Between the cold annular space (15), and the hot water annular space (16), the temperature control and regulating unit (5) has a control and stop shoulder (17) having a width which is less than the distance between the cold water control face (18) and the hot water control face (19), said shoulder projecting into the space between the cold water control face (18) and the hot water control face (19).

23 Claims, 3 Drawing Sheets

SANITARY MIXER TAP WITH THERMOSTAT CONTROL

BACKGROUND OF THE INVENTION

The invention relates to a thermostatically regulated sanitary mixer tap, with a cold water inlet, a hot water inlet, and a mixed-water outlet, with a fixed valve seat disk, with a valve disk that can be moved on the valve seat disk for volume control, with a temperature control and regulating unit that works with the valve disk to provide temperature control and regulation, with a control and regulating piston provided in the temperature control and regulating unit, with a temperature-dependent regulating element that works with the control and regulating piston, with an actuating lever and with a control lever connected to the actuating lever, whereby the valve seat disk has a cold water inlet opening connected to the cold water inlet and a hot water inlet opening connected to the hot water inlet, and the valve disk features passages that communicate with the cold water inlet opening of the valve seat disk and the hot water inlet opening of the valve seat disk, and the temperature control and regulating unit features cold and hot water inlet openings that communicate with the passages of the valve disk as well as a cold water annular space and a hot water annular space, and whereby the control and regulating piston can be placed in an initial temperature-determining position relative to the temperature control and regulating unit for purposes of temperature control and can be controlled by the regulating element in order to regulate temperature.

The prior art, on which the invention is based, includes first a thermostatically controlled sanitary mixer tap of the type basically described before, in which a control and regulating disk is provided in the temperature control and regulating unit (cf. DE-PS 35 25 052). In this connection, it has also already been mentioned to provide a control and regulating piston instead of a control and regulating disk (cf. claim 34 of DE-PS 35 25 052), without indicating in detail how the embodiment could appear with a control and regulating piston.

The thermostatically controlled sanitary mixer tap on which the invention is based and in which there is thus a control and regulating piston instead of a control and regulating disk exists only on paper (cf. U.S. Pat. No. 4,738,393, in particular FIGS. 6 to 10 and the corresponding description). Actually, the design implementation of this known sanitary mixer tap does not measure up to the requirements as regards both manufacture and function that can be and are levied on a high-quality series product, as represented by a sanitary mixer tap.

SUMMARY OF THE INVENTION

The task of the invention is now to design and further develop the known sanitary mixer tap on which the invention is based and in which a control and regulating piston is thus attached to the temperature control and regulating unit so that very stringent requirements can be met as regards both manufacture and function, i.e., in particular so that with relatively low material and manufacturing expense a sanitary mixer tap that remains maintenance-free for a long time can be produced and made available.

The sanitary mixer tap of the invention that is maintenance-free for a long time and can be produced at relatively low material and manufacturing expense is initially and essentially characterized by the fact that the temperature control and regulating unit features a control and stop shoulder between the cold water annular space and the hot water annular space, the control and regulating piston is designed in the shape of a sleeve and features a cold water control face and (at a distance from the cold water control face) a hot water control face, and the control and stop shoulder has a width that is less than the distance between the cold water control face and the hot water control face and extends into the space between the cold water control face and the hot water control face.

According to the invention, advantage is first taken of the fact that in a sanitary mixer tap of the type in question, i.e., a sanitary mixer tap with volume control, on the one hand, and temperature control and regulation, on the other, sealing in the actual sense of the word has be achieved only between the valve disk and the valve seat disk. In the sanitary mixer tap of the invention, the control and stop shoulder of the temperature control and regulating unit and the control faces of the control and regulating piston (cold water control face and hot water control face) that work with it consequently are not designed to ensure sealing in the actual sense. Rather, the ratio of flowing cold water to flowing hot water and thus the temperature of the mixed water are controlled by means of the flow cross-sections provided by the distance between the cold water control face and control and stop shoulder, on the one hand, and between the hot water control face and the control and stop shoulder, on the other.

For a thermostatically controlled sanitary mixer tap, it is essential that even relatively small temperature fluctuations be offset relatively quickly. The teaching of the invention obviously leads to the idea that to move the control and regulating piston relative to the temperature control and regulating unit for purposes of temperature regulation requires only especially small temperature regulating forces, which are produced by the temperature-dependent regulating element even with small temperature deviations. Actually, one hundred percent sealing requiting relatively high sealing forces is not necessary at all and consequently also not provided in the case of the sanitary mixer tap of the invention during the temperature-regulating displacement of the control and regulating piston.

There are now various ways to design and further develop the sanitary mixer tap of the invention.

A feature of the sanitary mixer tap of the invention is that the control and stop shoulder of the temperature control and regulating unit extends into the space between the control faces of the control and regulating piston (the cold water control face and hot water control face). To ensure that the sanitary mixer tap of the invention can be installed problem-free, a preferred embodiment of the sanitary mixer tap of the invention is characterized by the fact that the control and regulating piston consists of a first piston part and a second piston part. This makes it possible to insert the first piston part from the one side of the control and stop shoulder in the temperature control and regulating unit and the second piston part from the other side of the control and stop shoulder in the temperature control and regulating unit and then to connect the two piston parts, in whatever way, together.

The sanitary mixer tap of the invention also includes the feature that the control and regulating piston is designed in the shape of a sleeve. An embodiment of the sanitary mixer tap of the invention that uses this basic information in a special way is now characterized by the fact that the control and regulating piston features at least one passage that empties into the inner space of the control and regulating piston and communicates with the cold water annular space and/or with the hot water annular space depending on the position of the control and regulating piston relative to the temperature control and regulating unit. In this preferred embodiment of the sanitary mixer tap of the invention, the cold water and/or hot water is thus directed by the annular spaces (cold water annular space and hot water annular space) present in the temperature control and regulating unit into the inner space of the sleeve-shaped control and regulating piston, from where it then passes into the mixed-water outlet.

In the above-described preferred embodiment of a sanitary mixer tap of the invention, in which the water thus flows into the inner space of the sleeve-shaped control and regulating piston and from there passes into the mixed-water outlet, it is recommended, on the one hand, at least one strainer sleeve be provided, preferably attached to the inside wall in the inner space of the control and regulating piston and, on the other hand, that the regulating element be placed at least partially inside the control and regulating piston, i.e., in the inner space through which water flows. The placing of a strainer sleeve in the inner space of the control and regulating piston results, on the one hand, in good mixing of the cold and hot water and, on the other, (as is always desired in sanitary mixing fixtures) noise reduction. The placing of the regulating element at least partially inside the control and regulating piston, i.e., in the inner space of the control and regulating piston through which water flows, offers the advantage that the temperature-dependent regulating element responds to temperature deviations as promptly as possible —and consequently stabilizes the latter relatively quickly.

A preferred embodiment of the sanitary mixer tap of the invention is now further characterized by the fact that a control sleeve that overlaps the temperature control and regulating unit is provided and the control and regulating piston and the regulating element are clamped in the control sleeve. In this connection, another measure is of special importance, namely providing a travel-limiting unit in the axial direction of the control and regulating piston, preferably at least partially encompassing the latter coaxially; this travel-limiting unit allows spring-loaded movement of the regulating element relative to the control sleeve and prevents, in the case of a quick movement, especially in the case where the actuating lever is jerked from the hot to the cold position, the control and stop shoulder of the temperature control and regulating unit and the corresponding control face of the control and regulating piston, namely the hot water control face, and/or the actuating mechanism, from being damaged.

Relative to further possibilities for designing and further developing the sanitary mixer tap of the invention, reference is first made to the claims subordinate to claim 1. Moreover, the invention as well as designs and further developments of the invention based on a drawing depicting only embodiments are further explained below;

DETAILED DESCRIPTION

Figure 1:
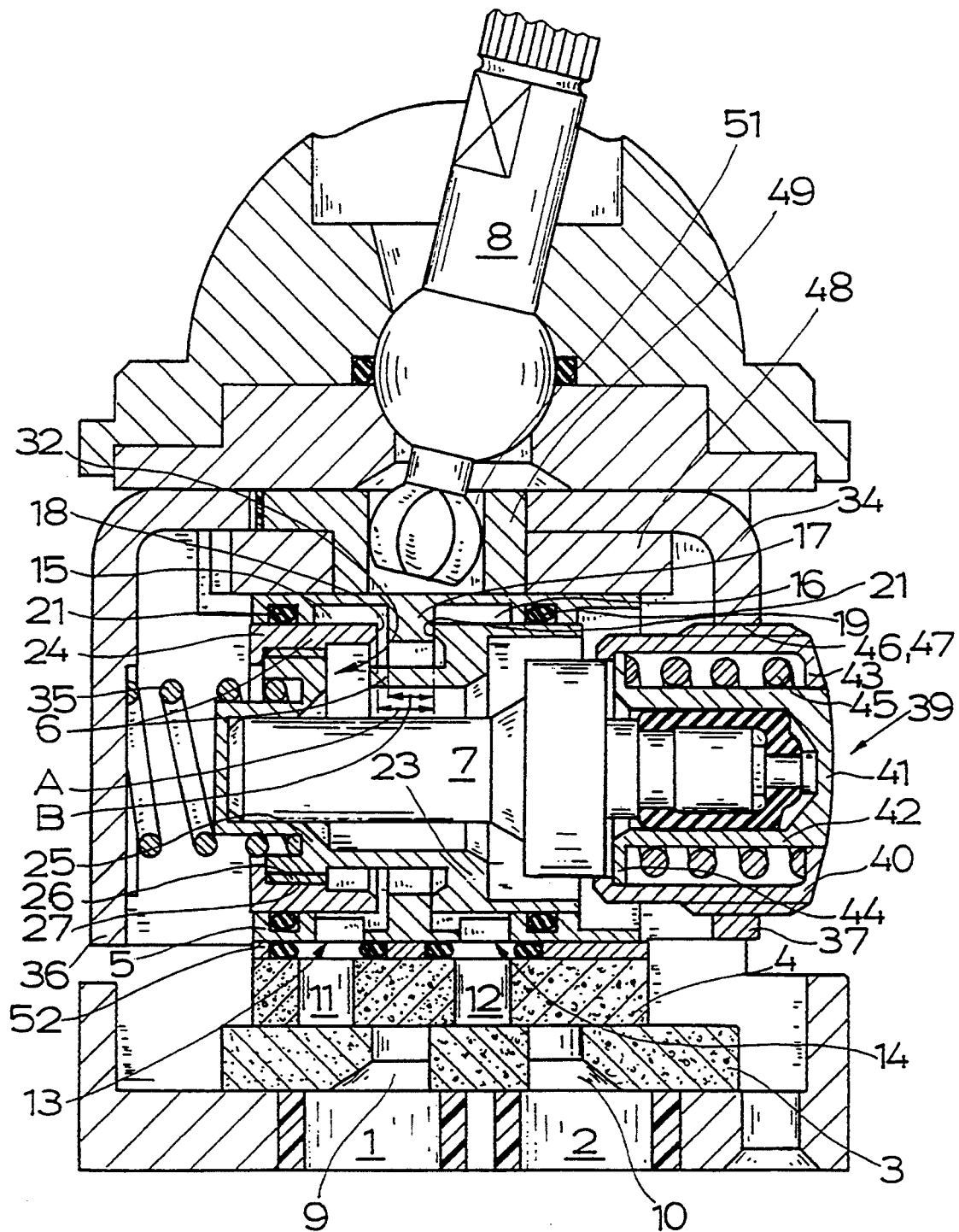
FIG. 1 a longitudinal section through the most important functional part of a first embodiment of a thermostatically controlled sanitary mixer tap of the invention, FIG. 2 a longitudinal section through essential functional parts of a second embodiment of a thermostatically controlled sanitary mixer tap of the invention and FIG. 3 in perspective representation, the control sleeve of the thermostatically controlled sanitary mixer tap depicted in FIG. 1 and 2.
Figure 2:
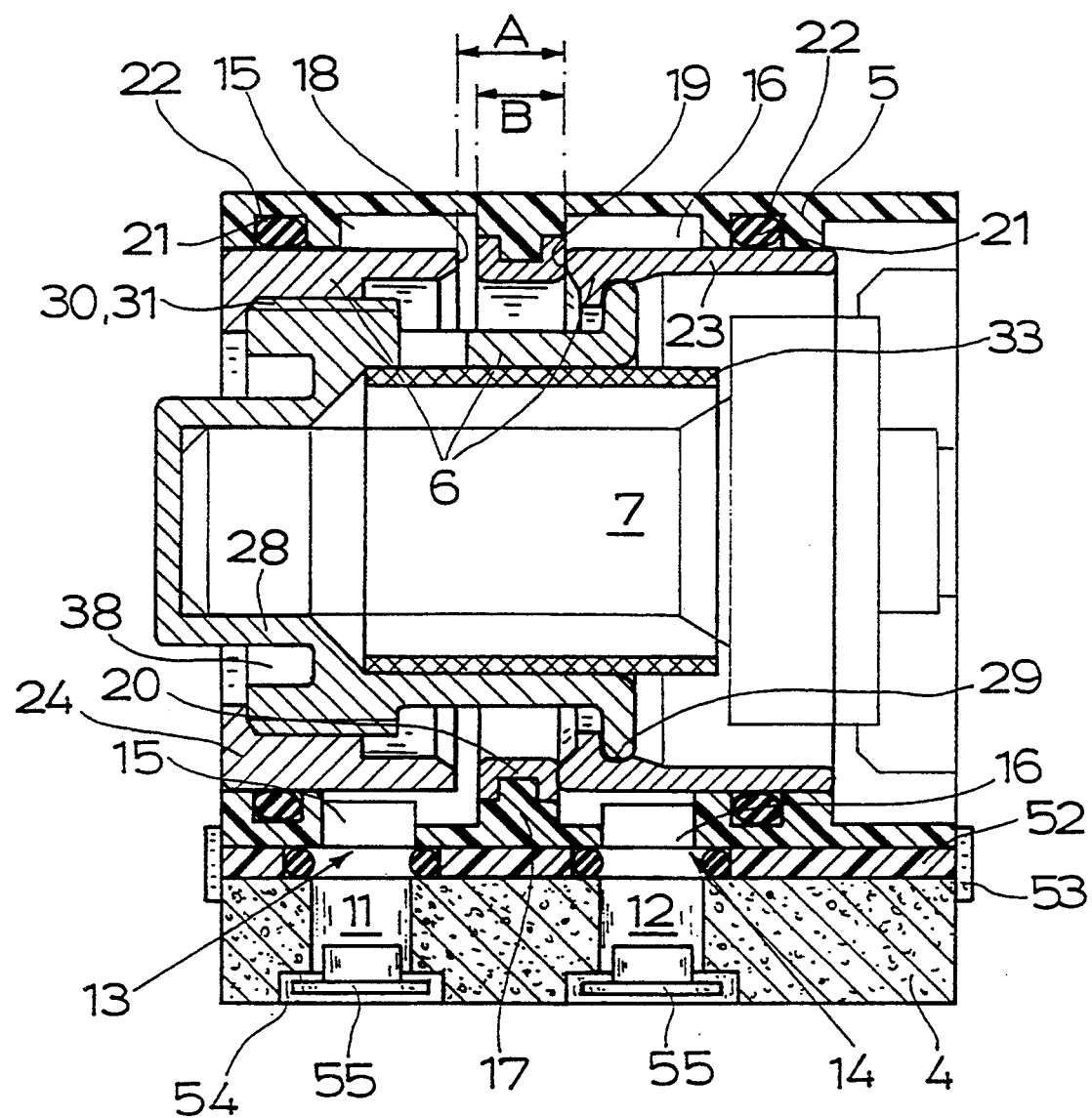
Figure 3:
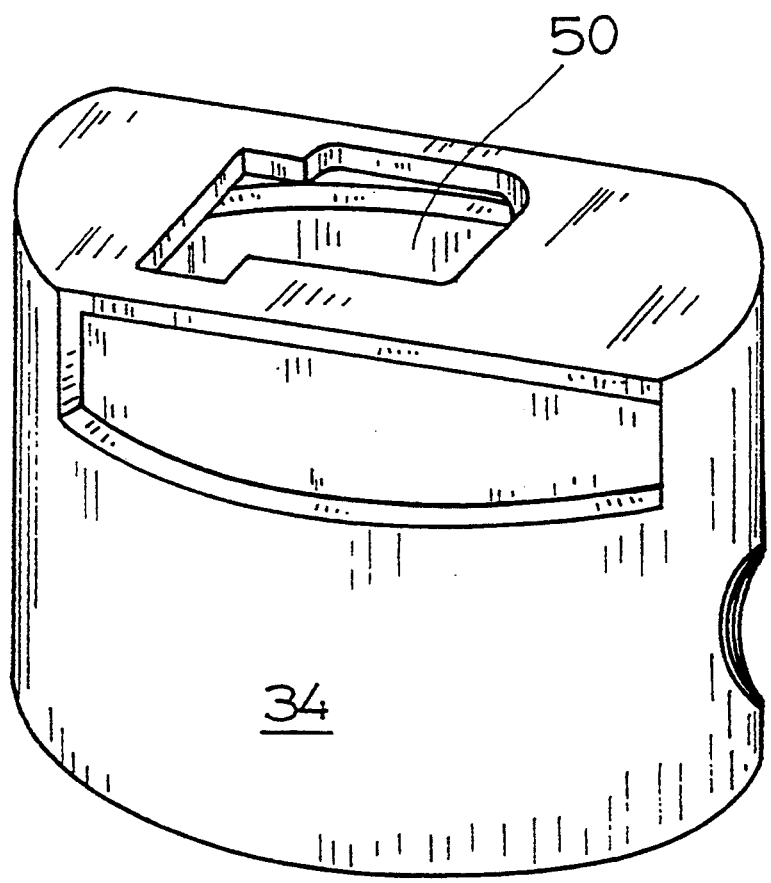

The sanitary mixer tap only partially depicted in FIG. 1 and 2 is a so-called single thermostat, i.e., volume control, on the one hand, and temperature control and regulation, on the other, take place at the point of consumption.

The thermostatically controlled sanitary mixer taps, which are only partially shown in FIG. 1 and 2, first include a cold water inlet 1, a hot water inlet 2, and a mixed-water outlet, not shown. Viewed in the direction of flow, a fixed valve seat disk 3, a valve disk 4 that can be moved on valve seat disk 3 for volume control and a temperature control and regulating unit 5 that works with valve disk 4 for temperature control and regulation are located behind cold water inlet 1 and hot water inlet 2. Furthermore, the sanitary mixer tap of the invention includes a control and regulating piston 6 provided in the temperature control and regulating unit 5, a temperature-independent regulating element 7 that works with the control and regulating piston 6, an actuating lever, not shown, and a control lever 8 connected to the actuating lever, not shown.

As only FIG. 1 shows, the valve seat disk 3 features a cold water inlet opening 9 connected to cold water inlet 1 and a hot water inlet opening 10 connected to hot water inlet 2. In the valve disk 4, as FIG. 1 and 2 show, are passages 11, 12 that communicate with cold water inlet opening 9 of valve seat disk 3 and hot water inlet opening 10 of valve seat disk 3. Temperature control and regulating unit 5 features cold and hot water inlet openings 13, 14 that communicate with passages 11, 12 of valve disk 4, as well as a cold water annular space 15 and a hot water annular space 16. Control and regulating piston 6 can be placed in an initial temperature-determining position relative to temperature control and regulating unit 5 for purposes of temperature control and can be controlled for purposes of temperature regulation by regulating element 7.

As FIG. 1 and 2 now show, for the sanitary mixer tap of the invention temperature control and regulating unit 5 features a control and stop shoulder 17 between cold water annular space 15 and hot water annular space 16, control and regulating piston 6 is designed in the shape of a sleeve and features a cold water control face 18 and (at distance A from cold water control face 18) a hot water control face 19, and control and stop shoulder 17 has a width B that is smaller than distance A between cold water control face 18 and hot water control face 19, and extends into the space between cold water control face 18 and hot water control face 19.

In the embodiment of a sanitary mixer tap of the invention depicted in FIG. 1, temperature control and regulating unit 5 is made of copper or brass, preferably brass. In contrast, temperature control and regulating unit 5 in the embodiment depicted in FIG. 2 is made of plastic. In this connection, control and stop shoulder 17 is then provided with a cladding 20 made of copper or brass, preferably brass.

It was already indicated in the introduction that in the sanitary mixer tap of the invention during the temperature-regulating displacement of control and regulating piston 6, one hundred percent sealing requiring relatively high sealing forces is not necessary and is consequently also not provided. This makes it possible to make the inside diameter d of temperature control and regulating unit 5 assigned to control and regulating piston 6 larger, preferably about 0.3 mm larger, than corresponding outside diameter D of control and regulating piston 6. To guide control and regulating piston 6 in temperature control and regulating unit 5, O-rings 21 that are only slightly prestressed, or sometimes not even prestressed at all, are provided in the depicted preferred embodiments of sanitary mixer taps of the invention between temperature control and regulating unit 5 and control and regulating piston 6. In this connection, O-rings 21 are attached to grooves 22 provided in temperature control and regulating unit 5.

For the preferred embodiment of a sanitary mixer tap of the invention depicted in FIG. 1, it is also true that control and regulating piston 6 consists of a first piston part 23 and a second piston part 24. In this connection, first piston part 23 features a connecting part 25 with outside threading 26 that extends into second piston part 24, second piston part 24 is provided with inside threading 27, and the two piston parts 23 and 24 are screwed together. The two piston parts 23, 24 are made of copper or brass, preferably brass.

For the embodiment of a sanitary mixer tap of the invention depicted in FIG. 2, control and regulating piston 6 consists of a first piston part 23, a second piston part 24, and an adapter 28 that connects the piston parts 23 and 24. In particular, adapter 28, on the one hand, is connected to first piston part 23 by a snap connection 29 and, on the other, it features outside threading 30 and extends with outside threading 30 into the second piston part 24, second piston part 24 is provided with inside threading 31, and the two piston parts 23 and 24 are screwed together. In this embodiment, both piston parts 23, 24 are made of copper or brass, preferably brass, and adapter 28 is made of plastic.

As previously described, both piston parts 23, 24 of control and regulating piston 6 are made of copper or brass, preferably brass, in the embodiments of sanitary mixer taps of the invention depicted in FIG. 1 and 2. But an embodiment not shown in the figures is also conceivable, in which the control and regulating piston as a whole is made of plastic and the cold water control face and hot water control face are equipped with cladding made of copper or brass, preferably brass.

For both embodiments of the sanitary mixing fixtures of the invention depicted in FIG. 1 and 2, it is also true that control and regulating piston 6 features passages 32 that empty into the inner space of control and regulating piston 6 and that communicate with cold water annular space 15 and/or with hot water annular space 16 depending on the position of control and regulating piston 6 relative to temperature control and regulating unit 5. In this connection, a strainer sleeve 33, preferably attached to the inside wall, depicted only in FIG. 2, can be provided as appropriate in the inner space of control and regulating piston 6, and regulating element 7 can be placed at least partially inside control and regulating piston 6, i.e., in its inner space.

It is depicted only in FIG. 1 that a control sleeve 34 which overlaps temperature control and regulating unit 5 is provided and control and regulating piston 6 and regulating element 7 are clamped in control sleeve 34. In particular, control and regulating pistons 6 are supported by a return spring 35 on a first support flange 36 of control sleeve 34 and regulating element 7 is supported on a second support flange 37 of control sleeve 34, that return spring 35 is designed as a helical compression spring, and that the end of control and regulating piston 6 facing return spring 35 features an annular groove 38 that receives the end of return spring 35 facing control and regulating piston 6.

Again, only FIG. 1 shows in detail that for the depicted embodiments of sanitary mixing fixtures of the invention, a travel-limiting unit 39 is provided between the end of regulating element 7 facing second support flange 37 of control sleeve 34 and second support flange 37 of control sleeve 34; this travel-limiting unit allows spring-loaded movement of the end of regulating element 7 facing second support flange 37 of control sleeve 34 relative to second support flange 37 of control sleeve 34. In particular, in this connection, travel-limiting unit 39 consists of an outside sleeve 40 that is connected to second support flange 37 of control sleeve 34, an inside sleeve 42 featuring a support flange 41 for regulating element 7, and a travel-limiting spring 45 that is provided between an inside shoulder 43 of outside sleeve 40, and an outside shoulder 44 of inside sleeve 42. In this connection, second support flange 37 of control sleeve 34 features a threaded hole 46 used to receive travel-limiting unit 39, outside sleeve 40 of travel-limiting unit 39 is equipped with outside threading 47, and travel-limiting unit 39 is screwed with the outside threading 47 of outside sleeve 40 into the threaded hole 46 of second support flange 37 of control sleeve 34.

Outside sleeve 40 and inside sleeve 42 of the above-described travel-limiting unit 39 are preferably made of plastic. In this connection, as not shown in detail, the outside sleeve of the travel-limiting unit can then feature at least one catching projection extending inward, and the inside sleeve can be equipped with at least one spring slot that divides its outside shoulder.

For the embodiments of sanitary mixing fixtures of the invention depicted in FIG. 1 and 2, it is also true that control sleeve 34 can be moved, on the one hand, with temperature control and regulating unit 5 and, on the other, relative to temperature control and regulating unit 5. For this purpose, temperature control and regulating unit 5 is equipped with a control head 48, a cam 49 is swivel-mounted in control head 48, control sleeve 34 features a control recess 50, and control sleeve 34 can move through the interaction of cam 49 and control recess 50, on the one hand, with temperature control and regulating unit 5 and, on the other, relative to temperature control and regulating unit 5. Cam 49 features a control recess 51 into which control lever 8 that is connected to the actuating lever, not shown, extends.

Finally, still other advantageous measures in connection with the sanitary mixer tap of the invention can be derived, especially from FIG. 2. First, valve disk 4 is connected by a connecting plate 52 to the temperature control and regulating unit, and connecting plate 52 features valve disk 4, on the one hand, and projections 53 that overlap temperature control and regulating unit 5, on the other. It can further be derived from FIG. 2 that passages 11, 12 in valve disk 4 have an enlargement 54 on the side facing valve seat disk 3 and that in each case a strainer insert 55 is provided in passages 11, 12 in valve disk 4 on the side facing valve seat disk 3.

It is not shown in the figures that in the sanitary mixer taps of the invention, the valve disk and the temperature control and regulating unit can be designed as a single unit, and then the passages in the valve seat disk coincide with the cold water inlet opening and the hot water inlet opening in the temperature control and regulating unit. But, as is also depicted in FIG. 1 and 2, it is better for valve disk 4, on the one hand, and temperature control and regulating unit 5, on the other, to be designed as separate components, since only then does the possibility exist to use for the two components materials that are optimum with respect to cost and function.

Finally, it is not shown in the figures that in the sanitary mixer taps of the invention, the temperature control and regulating unit can be designed as a single unit with the control head and the connecting plate; this is more economical than separate components. This integral design can are made of copper or brass but preferably, again for reasons of cost, of plastic.

I claim:

1. Thermostatically controlled sanitary mixer tap, with a cold water inlet, a hot water inlet and a mixed-water outlet, with a fixed valve seat disk, with a valve disk that can move on the valve seat disk for volume control, with a temperature control and regulating unit that works with the valve disk for temperature control and regulation, with a control and regulating piston provided in the temperature control and regulating unit, with a temperature-dependent regulating element that works with the control and regulating piston, with an actuating lever, and with a control lever connected to the actuating lever, whereby the valve seat disk has a cold water inlet opening that is connected to the cold water inlet and a hot water inlet opening that is connected to the hot water inlet, and the valve disk has passages that communicate with the cold water inlet opening of the valve seat disk and the hot water inlet opening of the valve seat disk, and the temperature control and regulating unit has cold and hot water inlet openings that communicate with the passages of the valve disk as well as a cold water annular space and a hot water annular space, and the control and regulating piston being placed in an initial temperature-determining position relative to the temperature control and regulating unit for purposes of temperature control and is controllable, for temperature regulation, by the regulating element, characterized in that said temperature control and regulating unit has a control and shoulder stop between the cold water annular space and the hot water annular space, the control and regulating piston is designed in the shape of a sleeve and has a cold water control face and, at a distance from the cold water control face, a hot water control face, in that control and stop shoulder has a width that is less than the distance between the cold water control face and the hot water control face, and extends into the space between the cold water control face and the hot water control face, in that the control and regulating piston has at least one passage that empties into an inner space of the control and regulating piston that communicates with at least one of said annular spaces depending on the position of the control and regulating piston relative to temperature control and regulating unit, and in that the regulating element is placed at least partially inside of the control and regulating piston and engages at one end of the control and regulating piston.

2. Sanitary mixer tap according to claim 1, wherein O-rings that are at most slightly prestressed are provided between the temperature control and regulating unit and the control and regulating piston, and wherein the temperature control and regulating unit has two grooves that receive the O-rings.

3. Sanitary mixer tap according to claim 1, wherein the control and regulating piston comprises a first piston part, a second piston part, and an adapter that connects the first and second piston parts.

4. Sanitary mixer tap according to claim 3, wherein the first piston part has a connecting part with an outside threading that extends into the second piston part, wherein the second piston part is provided with inside threading, and wherein the first and second piston parts are screwed together.

5. Sanitary mixer tap according to claim 3, wherein the adapter is connected by one of a plug-in, clamp, and snap type connection to the first piston part and has an outside threading with which it extends into the second piston part, the second piston part being provided with an inside threading, and the adapter and second piston part being screwed together.

6. Sanitary mixer tap according to claim 1, wherein at least one strainer sleeve is provided in the inner space of the control and regulating piston.

7. Sanitary mixer tap according to claim 1, wherein a control sleeve that overlaps temperature control and regulating unit is provided, and wherein the control and regulating piston and the regulating element are clamped in the control sleeve.

8. Sanitary mixer tap according to claim 7, wherein the control and regulating piston is supported, via a return spring, on a first support flange of the control sleeve, and wherein the regulating element is supported on a second support flange of the control sleeve.

9. Sanitary mixer tap according to claim 8, wherein the return spring is a cup spring.

10. Sanitary mixer tap according to claim 8, wherein the return spring is a helical compression spring, and wherein an end of the control and regulating piston that faces the return spring has an annular groove that receives an end of the return spring which faces the control and regulating piston.

11. Sanitary mixer tap according to claim 8, wherein a travel-limiting unit is provided between an end of the regulating element that faces the second support flange of the control sleeve and the second support flange of the control sleeve.

12. Sanitary mixer tap according to claim 11, wherein the travel-limiting unit allows spring-loaded movement of the end of the regulating element that faces the second support flange of the control sleeve relative to the second support flange of the control sleeve.

13. Sanitary mixer tap according to claim 12, wherein the travel-limiting unit comprises an outside sleeve connected to the second support flange of the control sleeve, an inside sleeve that has a support flange for the regulating element and a travel-limiting spring provided between an inside shoulder of outside sleeve and an outside shoulder of inside sleeve.

14. Sanitary mixer tap according to claim 13, wherein the second support flange of the control sleeve has a threaded hole to receive the travel-limiting unit, wherein the outside sleeve of the travel-limiting unit is equipped with an outside threading, and wherein the travel-limiting unit is screwed into the threaded hole of the second support flange of the control sleeve via the outside threading of the outside sleeve.

15. Sanitary mixer tap according to claim 13 wherein the outside sleeve of the travel-limiting unit has at least one inwardly extending catching projection, and wherein the inside sleeve is equipped with at least one spring slot that divides its outside shoulder.

16. Sanitary mixer tap according to claim 7, wherein the control sleeve is movable with the temperature control and regulating unit and relative to the temperature control and regulating unit.

17. Sanitary mixer tap according to claim 16, wherein the temperature control and regulating unit is provided with a control head, wherein a cam is swivel-mounted in the control head, wherein the control sleeve has a control recess, and is movable, through the interaction of said can and a control recess, with the temperature control and regulating unit and relative to temperature control and regulating unit.

18. Sanitary mixer tap according to claim 17, wherein the cam has a control recess and the control lever that is connected to the actuating lever engages in the control recess of the cam.

19. Sanitary mixer tap according to claim 1, wherein the valve disk is connected by a connecting plate to the temperature control and regulating unit.

20. (Amended) Sanitary mixer tap according to claim 19, wherein the connecting plate has projections that overlap the valve disk and the temperature control and regulating unit.

21. Sanitary mixer tap according to claim 1, wherein the valve disk and the temperature control and regulating unit are formed as a single unit.

22. Sanitary mixer tap according to claim 1, wherein the passages in the valve disk are provided with an enlargement a side which faces the valve seat disk.

23. Sanitary mixer tap according to claim 1, wherein a strainer insert is provided in the passages in the valve disk a side that faces the valve seat disk.

* * * * *